US012586376B2

(12) United States Patent
So et al.

(10) Patent No.: US 12,586,376 B2
(45) Date of Patent: Mar. 24, 2026

(54) DISPLAY DEVICE SURVEILLANCE DETECTION

(71) Applicant: Hewlett-Packard Development Company, L.P., Spring, TX (US)

(72) Inventors: Chi Wai So, Spring, TX (US); Yun David Tang, Spring, TX (US); Guoxing Yang, Spring, TX (US); Alexander Wayne Clark, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 184 days.

(21) Appl. No.: 18/258,382

(22) PCT Filed: Jan. 22, 2021

(86) PCT No.: PCT/US2021/014669
§ 371 (c)(1),
(2) Date: Jun. 20, 2023

(87) PCT Pub. No.: WO2022/159102
PCT Pub. Date: Jul. 28, 2022

(65) Prior Publication Data
US 2024/0029440 A1 Jan. 25, 2024

(51) Int. Cl.
| | |
|---|---|
| *G06V 20/52* | (2022.01) |
| *G06F 21/62* | (2013.01) |
| *G06F 21/84* | (2013.01) |
| *G06V 40/16* | (2022.01) |

(52) U.S. Cl.
CPC .......... *G06V 20/52* (2022.01); *G06F 21/6245* (2013.01); *G06F 21/84* (2013.01); *G06V 40/172* (2022.01)

(58) Field of Classification Search
CPC ..... G06F 21/84; G06F 21/6245; G06V 20/52; G06V 40/172
See application file for complete search history.

(56) References Cited

U.S. PATENT DOCUMENTS

| | | | |
|---|---|---|---|
| 8,908,034 | B2 | 12/2014 | Bordonaro |
| 8,973,149 | B2 | 3/2015 | Buck |
| 9,824,241 | B2 | 11/2017 | Moore |
| 10,599,877 | B2 | 3/2020 | Lam et al. |
| 2013/0254874 | A1 | 9/2013 | Xu |
| 2014/0078164 | A1* | 3/2014 | Chan ..................... H04N 23/21 |
| | | | 345/589 |

(Continued)

FOREIGN PATENT DOCUMENTS

TW           202101293 A       1/2021

*Primary Examiner* — Han Yang
(74) *Attorney, Agent, or Firm* — Quarles & Brady LLP

(57) ABSTRACT

Examples of electronic devices are described herein. In some examples, an electronic device includes a camera. In some examples, the electronic device includes a display device. In some examples, the electronic device includes a processor to detect a scene change in a first set of images captured by the camera. The first set of images has a first resolution. The processor is also to detect surveillance of the display device in response to detecting the scene change. The surveillance detection is based on a second set of images captured by the camera. The second set of images has a second resolution that is higher than the first resolution.

14 Claims, 7 Drawing Sheets

(56) References Cited

U.S. PATENT DOCUMENTS

| | | |
|---|---|---|
| 2014/0198958 A1 | 7/2014 | Nathan et al. |
| 2014/0201844 A1* | 7/2014 | Buck ..................... G06F 21/554 |
| | | 726/26 |
| 2015/0113666 A1 | 4/2015 | Buck |
| 2018/0018508 A1 | 1/2018 | Tusch |
| 2018/0048878 A1 | 2/2018 | Chan et al. |
| 2020/0159937 A1* | 5/2020 | Schondorf ........... G06F 21/554 |
| 2020/0413010 A1 | 12/2020 | Kuo et al. |
| 2021/0073421 A1* | 3/2021 | Anderson ............... G06F 3/013 |
| 2021/0407131 A1* | 12/2021 | Kallakuri ............... G06V 10/46 |

* cited by examiner

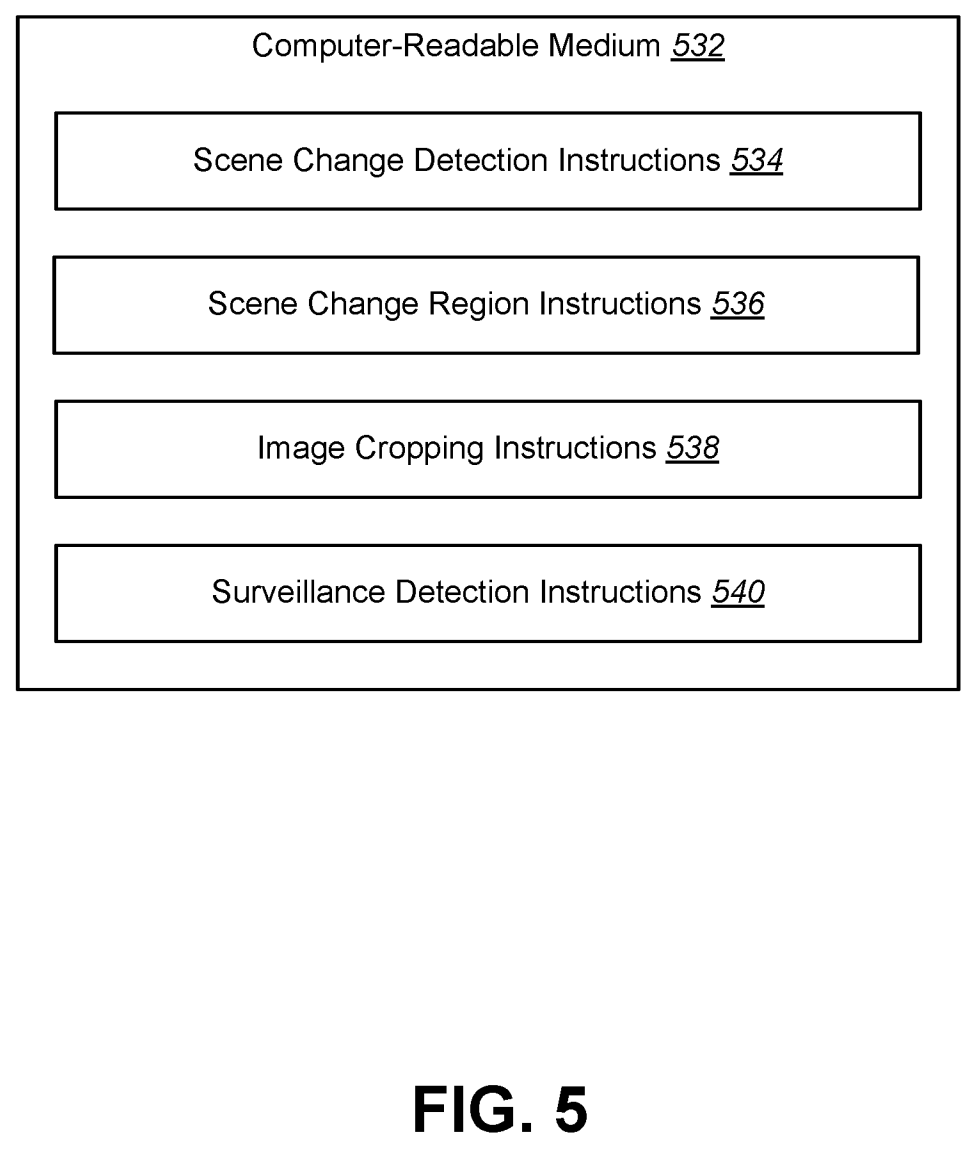

Computer-Readable Medium 532

Scene Change Detection Instructions 534

Scene Change Region Instructions 536

Image Cropping Instructions 538

Surveillance Detection Instructions 540

FIG. 5

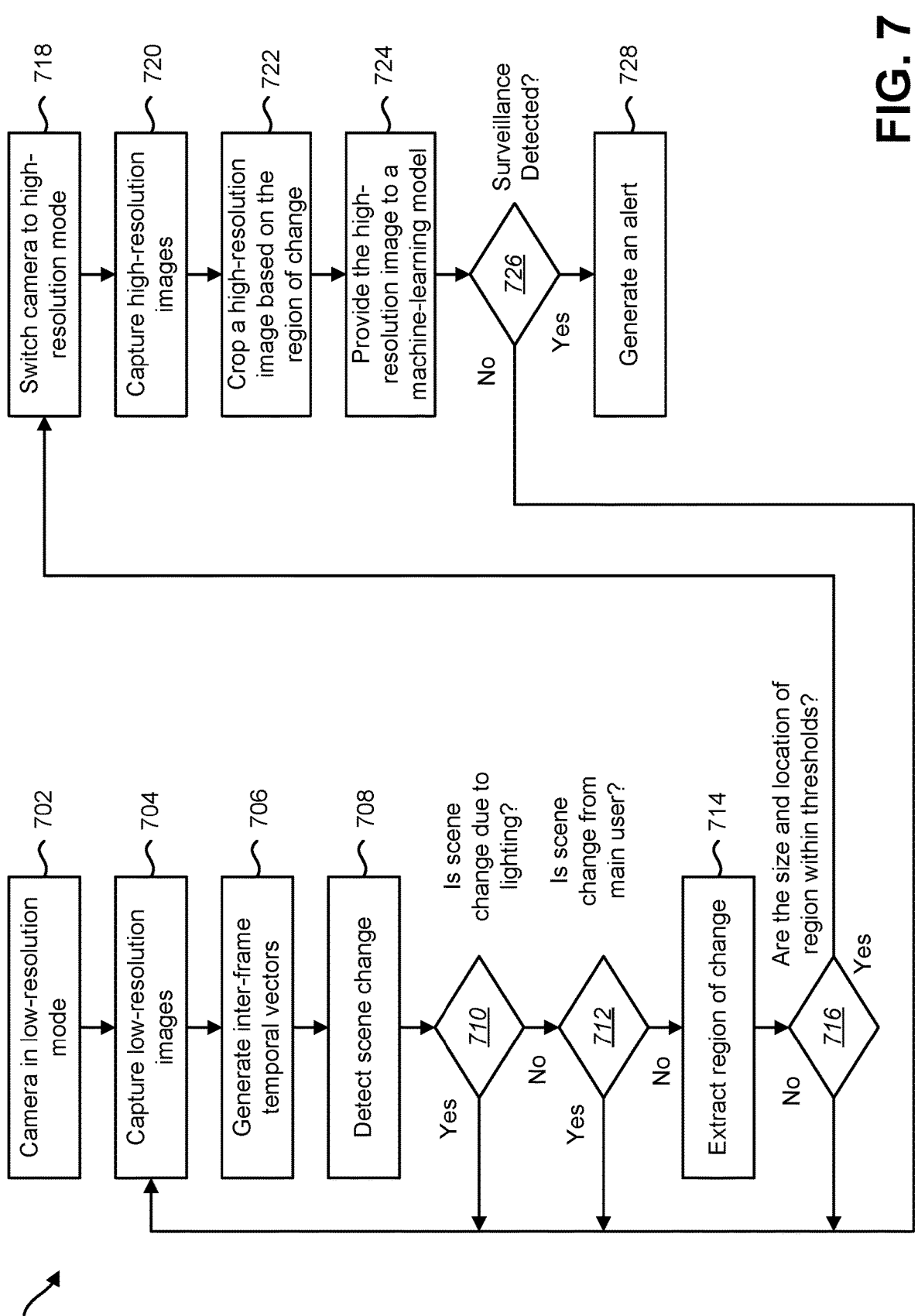

Camera in low-resolution mode — 702

Capture low-resolution images — 704

Generate inter-frame temporal vectors — 706

Detect scene change — 708

Is scene change due to lighting? — 710 — Yes

No

Is scene change from main user? — 712 — Yes

No

Extract region of change — 714

Are the size and location of region within thresholds? — 716

No

Yes

Switch camera to high-resolution mode — 718

Capture high-resolution images — 720

Crop a high-resolution image based on the region of change — 722

Provide the high-resolution image to a machine-learning model — 724

Surveillance Detected? — 726

No

Yes

Generate an alert — 728

DISPLAY DEVICE SURVEILLANCE DETECTION

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

FIG. 5 is a block diagram illustrating an example of a computer-readable medium for detecting surveillance of a display device;

FIG. 7 is a flow diagram illustrating another example of a method for detecting display device surveillance.

Figure 1:
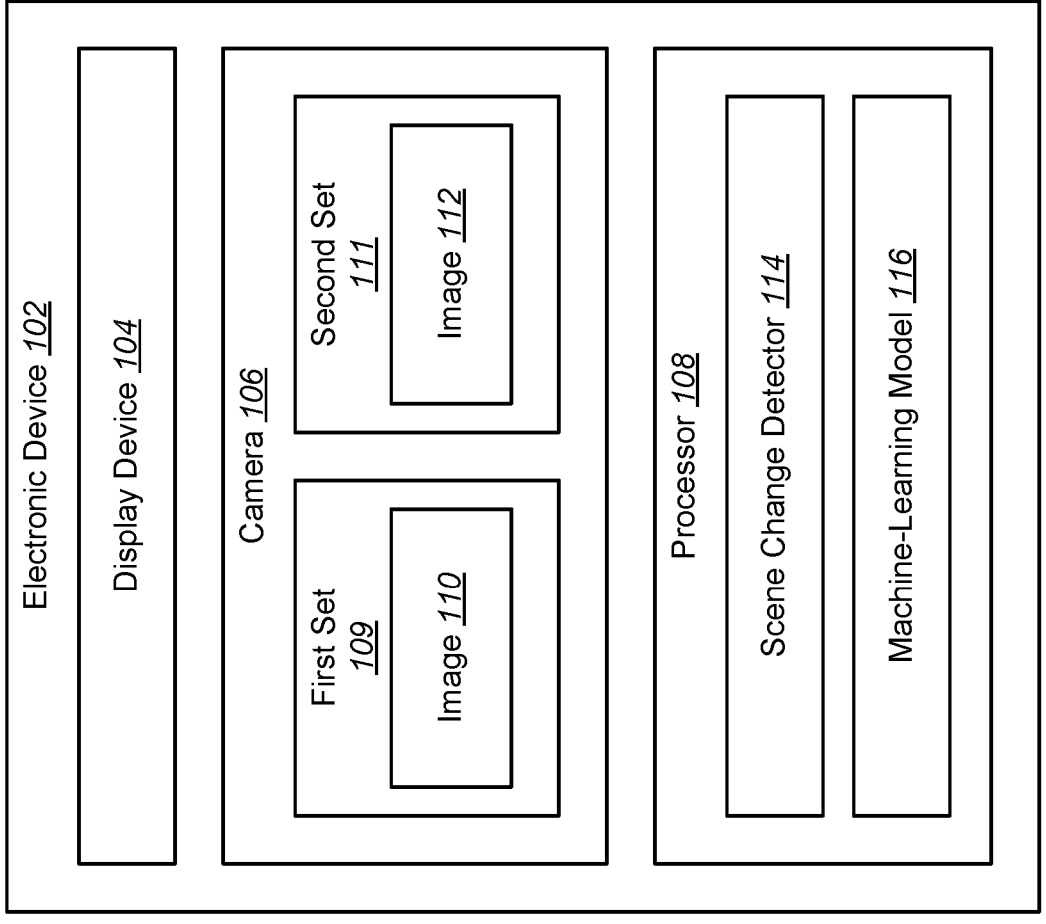
FIG. 1 is a block diagram illustrating an example of an electronic device to detect surveillance of a display device.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, wireless communication devices, game consoles, game controllers, smart appliances, printing devices, vehicles with electronic components, aircraft, drones, robots, smart appliances, etc.

In some examples, an electronic device may include a display device. Privacy and security of information presented by the electronic device is a concern. For example, a user or organization may desire that the contents displayed on the screen of the display device are well protected. In other examples, the electronic device may be used for communications (e.g., video conferences) in which sensitive information is displayed.

In some scenarios, a user may not be aware of surveillance of the electronic device. For example, a person may look over the shoulder of the user to read the screen of the display device. In another example, a person may surreptitiously operate a recording device (e.g., a camera) to record the display device, thus compromising the security of the information displayed by the display device. In these examples, the surveillance of the electronic device may compromise the security and privacy of the user of the electronic device.

In some examples, an electronic device (e.g., laptop computer, desktop computer, tablet computer, smartphone, etc.) may have a camera for capturing images. For example, the camera may be a built-in camera(s) or an external camera (e.g., web camera (webcam)). In some examples, the camera may be a user-facing camera used for capturing digital images, video conferencing and/or other applications.

In the examples described herein, a camera may be used to detect surveillance of a display device. For example, using a camera, the electronic device may detect over-the-shoulder camera surveillance of a user's computer display. The camera surveillance from another person may include capturing pictures and/or recording a video, which infringes the user's privacy and poses a threat on data security. A camera, in conjunction with computer vision capabilities of the electronic device, may recognize surveillance of the electronic device and may alert the user of potential privacy concerns.

FIG. 1 is a block diagram illustrating an example of an electronic device 102 to detect surveillance of a display device 104. Examples of the electronic device 102 may include computing devices, laptop computers, desktop computers, tablet devices, cellular phones, smartphones, wireless communication devices, gaming consoles, gaming controllers, smart appliances, printing devices, vehicles (e.g., automobiles) with electronic components, aircraft, drones, robots, smart appliances, etc.

In some examples, the electronic device 102 may include a processor 108. The processor 108 may be any of a microcontroller (e.g., embedded controller), a central processing unit (CPU), a semiconductor-based microprocessor, graphics processing unit (GPU), field-programmable gate array (FPGA), an application-specific integrated circuit (ASIC), a circuit, a chipset, and/or other hardware device suitable for retrieval and execution of instructions stored in a memory. The processor 108 may fetch, decode, and/or execute instructions stored in memory (not shown). While a single processor 108 is shown in FIG. 1, in other examples, the processor 108 may include multiple processors (e.g., a CPU and a GPU).

The memory of the electronic device 102 may be any electronic, magnetic, optical, and/or other physical storage device that contains or stores electronic information (e.g., instructions and/or data). The memory may be, for example, Random Access Memory (RAM), Electrically Erasable Programmable Read-Only Memory (EEPROM), Dynamic Random Access Memory (DRAM), Synchronous DRAM (SDRAM), magnetoresistive random-access memory (MRAM), phase change RAM (PCRAM), non-volatile random-access memory (NVRAM), memristor, flash memory, a storage device, and/or an optical disc, etc. In some examples, the memory may be a non-transitory tangible computer-readable storage medium, where the term "non-transitory" does not encompass transitory propagating signals. The processor 108 may be in electronic communication with the memory. In some examples, a processor 108 and/or memory of the electronic device 102 may be combined with or separate from a processor (e.g., CPU) and/or memory of a host device.

The electronic device 102 may include a display device 104. The display device 104 may be referred to as a monitor, touchscreen, screen, or display of the electronic device 102. In some examples, the display device 104 may include circuitry (e.g., hardware) and/or instructions (e.g., software)

for presenting information to a user. In some examples, a display device 104 may be attached to or may be external from the electronic device 102. Some examples of technologies used by the display device 104 include an electroluminescent (ELD) display, a liquid crystal display (LCD), light-emitting diode (LED) backlit LCD, thin-film transistor (TFT) LCD, light-emitting diode (LED) display (e.g., organic light-emitting diode (OLED)), active-matrix LED (AMOLED) display, plasma (PDP) display, and/or quantum dot (QLED) display.

The electronic device 102 may include a camera 106. In some examples, the camera 106 may be integrated with the electronic device 102. For example, in the case of a laptop computer, a tablet computer, or a smartphone, the camera 106 may be built into the electronic device 102. In other examples, the camera 106 may be separate from the electronic device 102 but may communicate with the electronic device 102. For example, an external webcam may be connected to the electronic device 102.

The camera 106 may be positioned to view the user (also referred to as the main user) of the electronic device 102. For example, the camera 106 of a laptop computer may view the user when the case of the laptop computer is open. In this scenario, the camera 106 may be located in a frame of the case housing the display device 104 of the laptop computer. In other examples, the camera 106 may be a front-facing camera of a tablet computer or smartphone. In yet other examples, the camera 106 may be a webcam or other external camera positioned to view the user of the electronic device 102.

In some examples, the electronic device 102 may be equipped with a camera 106 that captures video images. The camera 106 may include computer vision capabilities to recognize a variety of potential recording devices. In some examples, the camera 106 may be built into the electronic device 102 as in the case of a notebook computer. In other cases, the camera 106 may be external to the electronic device 102 such as a universal serial bus (USB) web camera. An external USB camera may be used when an external display device 104 (e.g., monitor) is connected to the electronic device 102. The camera 106 may face the main user and have a field of view behind the main user.

The camera 106 may operate in different modes. In some examples, the camera 106 may capture images in a low-resolution mode or a high-resolution mode. The camera 106 may switch between modes (e.g., low-resolution mode or high-resolution mode). In one example, low-resolution mode may be video graphics array (VGA) resolution for the camera 106. In this example, the resolution for images captured in low-resolution mode may be 640×480 pixels, and a frame rate may be 60 frames-per-second (fps). In another example of low-resolution mode, a lower quarter video graphics array (QVGA) resolution may be used for power savings. In this case, the resolution may be 320×240 pixels with a frame rate of 120 fps.

In some examples, the high-resolution mode may be full high definition (HD), which may have a resolution of 1920×1080 pixels and a frame rate of 30 fps. In another example, an HD resolution for high-resolution mode may be 1280×720 pixels in resolution with a frame rate of 30 fps or 60 fps. In yet other examples, the high-resolution mode may include 5 megapixel (MP) resolution. In this case, the image resolution may be 2592×1944 pixels.

As described above, privacy and security of a display device 104 may be a concern for a user or organization. In some examples, the camera 106 may be used to protect information displayed on the display device 104 from human observers and/or recording devices (e.g., cameras). An example of a surveillance scenario is illustrated in FIG. 2.

Figure 2:
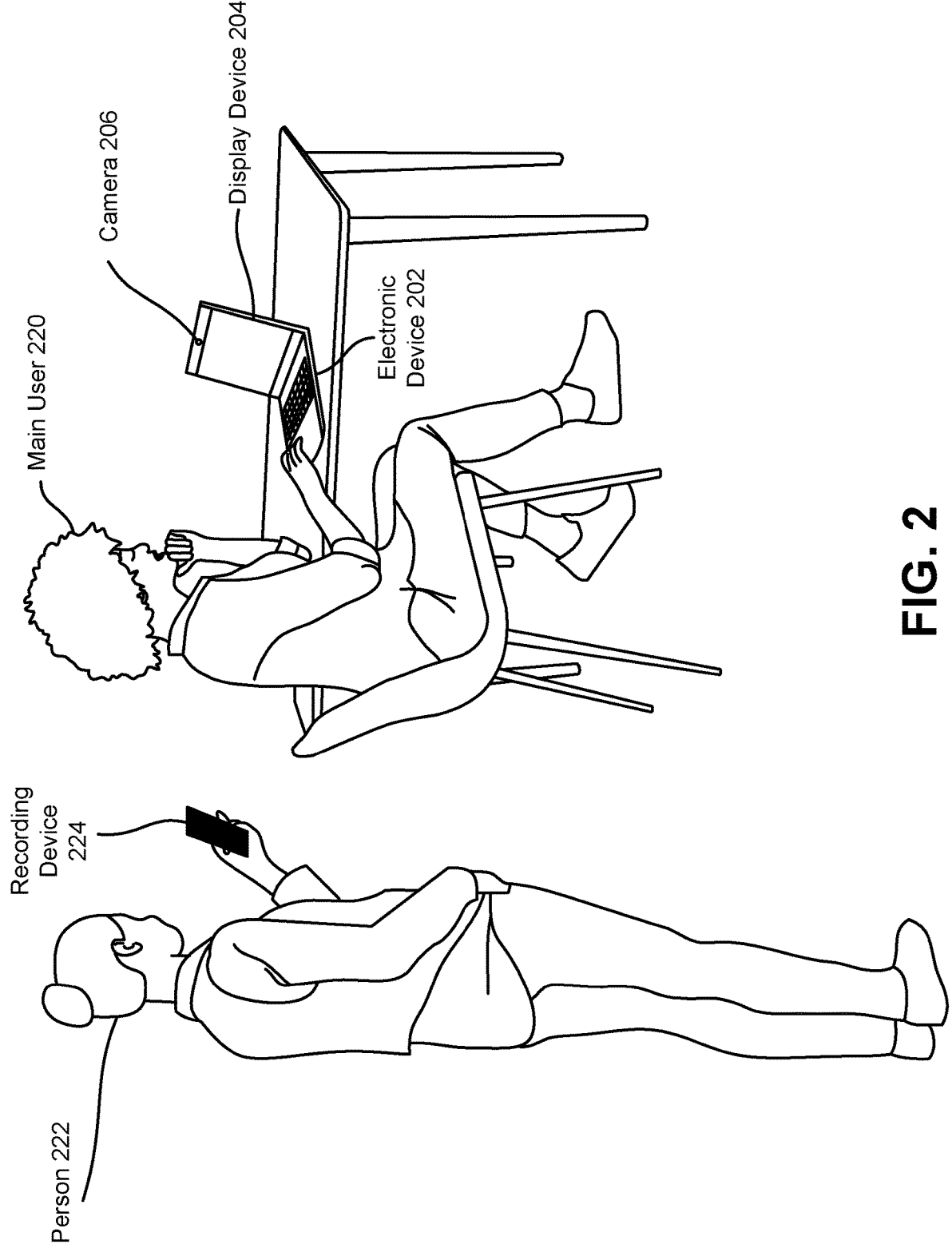
FIG. 2 is an example of a surveillance scenario.

As seen in FIG. 2, a main user 220 may be using an electronic device 202 having a display device 204 and a camera 206. A person 222 may position themselves behind the main user 220 in a manner that gives the person 222 a view of the display device 204. In some examples, the person 222 may attempt to read information displayed on the display device 204. This scenario may be referred to as shoulder surfing.

In other examples, the person 222 may direct a recording device 224 at the display device 204 to capture images (e.g., still images and/or video images) of the display device 204. Examples of a recording device 224 include a webcam, a smartphone with a camera, a camcorder, augmented reality glasses, digital single-lens reflex camera (DSLR), etc.

In these examples, the information displayed on the display device 204 may be compromised without the main user 220 being aware of the surveillance. However, it should be noted that the camera 206 may view the person 222 and/or recording device 224 positioned behind or to the side of the main user 220. The camera 206 may be used by the electronic device 202 to detect surveillance of the display device 204.

Referring again to FIG. 1, the electronic device 102 may include circuitry and/or instructions to detect surveillance of the display device 104. In some examples, the electronic device 102 may utilize the camera 106 and computer vision processes to detect surveillance of the display device 104.

In some examples, the electronic device 102 may use a two-stage approach for surveillance detection. In a first stage, the electronic device 102 may detect scene changes. In a second stage, the electronic device 102 may use a machine-learning (ML) model 116 to detect surveillance of the display device 104 based on scene changes.

In some examples, the processor 108 may perform the surveillance detection based on images captured by the camera 106. In some examples, the processor 108 may be embedded in the camera 106. For example, the processor 108 may reside in an image signal processor (ISP) chip of the camera 106. In other examples, the processor 108 may be included in a vision chip that is separate from (e.g., external to) the camera 106. In yet other examples, the processor 108 may run on a host of the electronic device 102 with a GPU.

The processor 108 may implement a scene change detector 114. In some examples, the scene change detector 114 may include instructions executed by the processor 108. The scene change detector 114 may detect a scene change in a first set of images (referred to herein as a first set 109) captured by the camera 106. The first set 109 may include a plurality of images. In some examples, the scene change detector 114 may detect the scene change by comparing an image 110 with a previous image in the first set 109.

In some examples, images in the first set 109 may have a first resolution. For instance, the first set 109 may include a number of low-resolution images. The camera 106 may provide images from the first set 109 to the processor 108. In some examples, the camera 106 may be set to operate in low-resolution mode while capturing the first set 109 of images.

In some examples, the electronic device 102 may perform an initialization procedure before detecting a scene change. For example, the user may sit in front of the electronic device 102 and log into the electronic device 102. With the camera 106 enabled, the camera 106 may capture an image.

The electronic device 102 may then locate the main user with a bounding box and may obtain the initial background with the main user in the scene.

In some examples, after a main user is registered and a background is captured, a change of the background may be detected by the scene change detector 114. For example, the scene change detector 114 may determine a region in an image 110 in the first set 109 with a change greater than a threshold amount.

In some examples, the scene change detector 114 may ignore lighting changes and main-user movement. For example, lighting changes in a scene may occur due to different positions of the sun and/or changes in artificial lighting. The scene change detector 114 may exclude lighting changes from triggering a scene change.

Lighting variation may be detected as a global brightness change in the entire image 110 of the first set 109 including a foreground main user and the background. Lighting changes may not represent changes in background objects. The scene change detector 114 may verify lighting changes based on a change in the exposure from the image 110 of the first set 109 and a prior image. In some examples, the processor 108 may convert a color image (e.g., RGB image) to grayscale. The scene change detector 114 may then determine the change in gray value in image pixels in an RGB-converted grayscale image. If a lighting change is detected with a defined threshold, the scene change detector 114 may ignore the lighting change as a trigger for a scene change. In other words, the scene change detector 114 may detect a lighting change, which may be treated as a false alarm that does not trigger the next stage of surveillance detection. This is as opposed to detection of a new object in the background of the first set 109.

The scene change detector 114 may also detect movement of the main user and exclude the main user movement from triggering a scene change. In some examples, the user's region may be defined, and the motion of the user may be tracked based on location differences from a previously detected region. In an example, a user may sit close to the camera 106 and may appear in the center of an image (e.g., the image 110 of the first set 109) captured by the camera 106. The scene change detector 114 may ignore lighting changes and user movements that are within thresholds. Likewise, the scene change detector 114 may ignore the scene change due to the user's change of the angle of the camera 106, as in the case of a change in the lid angle of a laptop computing device.

A scene change (also referred to as a background change) may include a change in an object other than the main user. In some examples, the scene change detector 114 may monitor for a scene change in a certain area of the image 110 of the first set 109. For example, a scene change may occur in the upper portion or the two sides (e.g., the left side or right side) of the image 110 outside the central portion occupied by the main user.

In some examples, the scene change detector 114 may detect a scene change based on the difference between an image of the first set 109 and a prior image. For example, the scene change detector 114 may generate inter-frame temporal vectors between the image 110 of the first set 109 and a prior image. In some examples, the inter-frame temporal vectors are generated from a pixel-wise image difference for each two-dimensional (2D) pixel xi, yi (where i=1, . . . n) between pairs of images.

In other examples, the inter-frame temporal vectors may be generated from a pairwise offset of the corresponding image features of two consecutive images in the first set 109.

In some examples, the feature points may be extracted edge points, corner points, and/or other image features. In this case, an inter-frame temporal vector may depict the 2D velocity u, v for each point x, y. This process may be referred to as optical flow, which depicts pointwise local motion on an image plane.

In some examples, the scene change detector 114 may determine an inter-frame pixel-wise difference to detect a region of pixels in the image 110 of the first set 109 with a difference greater than a threshold. In other examples, the scene change detector 114 may use the average of motion vectors of image features in the image 110 to detect a region of pixels where the velocity is greater than a threshold. The detected region may be considered an object region. In other words, the region may contain an object that entered the scene as observed by the camera 106. In some examples, the scene change detector 114 may connect multiple regions of change within proximity to each other into one larger region.

In some examples, the scene change detector 114 may then calculate the location and size of the detected region of change in the image 110 of the first set 109. For example, the scene change detector 114 may calculate the location of the center of the region. The scene change detector 114 may also determine the size of the region. In some examples, the size may be the number of pixels in the region.

In some examples, the scene change detector 114 may determine whether the location of the region is within a location threshold. For example, a location threshold may be a range of pixel locations within the image 110 of the first set 109 where the center of the region may be located. In an example, if the center of the region is near the border of the image 110, then the location of the region may not be within the location threshold. In this case, the image 110 may be discarded. In other words, the scene change detector 114 may exclude the detected scene change in the image 110 of the first set 109 from triggering the next stage of surveillance detection.

In some examples, the scene change detector 114 may determine whether a size of the region is greater than a size threshold. For example, the size threshold may be a defined number of pixels. In some examples, the size threshold may be based on a size of a human in the background of the image 110 of the first set 109. If the size of the region is below the size threshold, then the region may not satisfy the condition as potential human object.

If no region in the image 110 of the first set 109 meets the location threshold or the size threshold, then the electronic device 102 may discard the image 110. The electronic device 102 may continue to capture another low-resolution image to determine whether a scene change occurs. In some examples, the camera 106 may capture low-resolution images with a defined sampling rate (e.g., 10-15 images per second, or 3-5 images per second for a power-saving mode).

In some examples, the processor 108 may detect surveillance of the display device in response to detecting the scene change. For example, if the scene change detector 114 detects a region of change in the image 110 of the first set 109 with a location within the location threshold and a size greater than the size threshold, then the processor 108 may activate surveillance detection. For example, if the region is within the location threshold and greater than the size threshold, then this may indicate a scene change related to a new object. The processor 108 may switch to a surveillance detection mode with a higher camera resolution for recognizing hand, head pose and/or recording devices.

In some examples, the camera 106 may capture a second set 111 of images with a second resolution that is higher than the first resolution of the first set 109. For example, the camera 106 may be set to capture images in the second set 111 in a high-resolution mode. Therefore, the first set 109 may include low-resolution images and the second set 111 may include high-resolution images. In some examples, the camera 106 may capture a number of images in the second set 111.

The processor 108 may select an image 112 from the second set 111 to use for surveillance detection. For example, after switching from low-resolution mode to high-resolution mode, the processor 108 may wait for a number of frames to give the camera 106 time to stabilize and adjust to the second resolution (e.g., high-resolution mode) after the camera setting change. The processor 108 may then select the image 112 of the second set 111 for further processing.

In some examples, the processor 108 may map the region in the image 110 of the first set 109 to the image 112 of the second set 111. For example, the region in the image 110 of the first set 109 may be upscaled and mapped to corresponding pixels in the image 112 of the second set 111. The processor 108 may then crop the image 112 of the second set 111 based on the region mapped to the image 112 of the second set 111. For example, the region of change in the high-resolution image 112 may be cropped to reduce the amount of processing that is to be performed during the surveillance detection. In this case, the image 112 may be the cropped region.

In some examples, the high-resolution mode for the second set 111 of images may be of a different aspect ratio from that of the low-resolution mode for the first set 109. For instance, the high-resolution mode may include a 16:9 aspect ratio (e.g., full HD), and the low-resolution mode may include a 4:3 aspect ratio (e.g., VGA), In this case, the mapping from a low-resolution image 110 to the high-resolution image 112 may be based on the actual region of the camera field of view (FOV).

Figure 3:
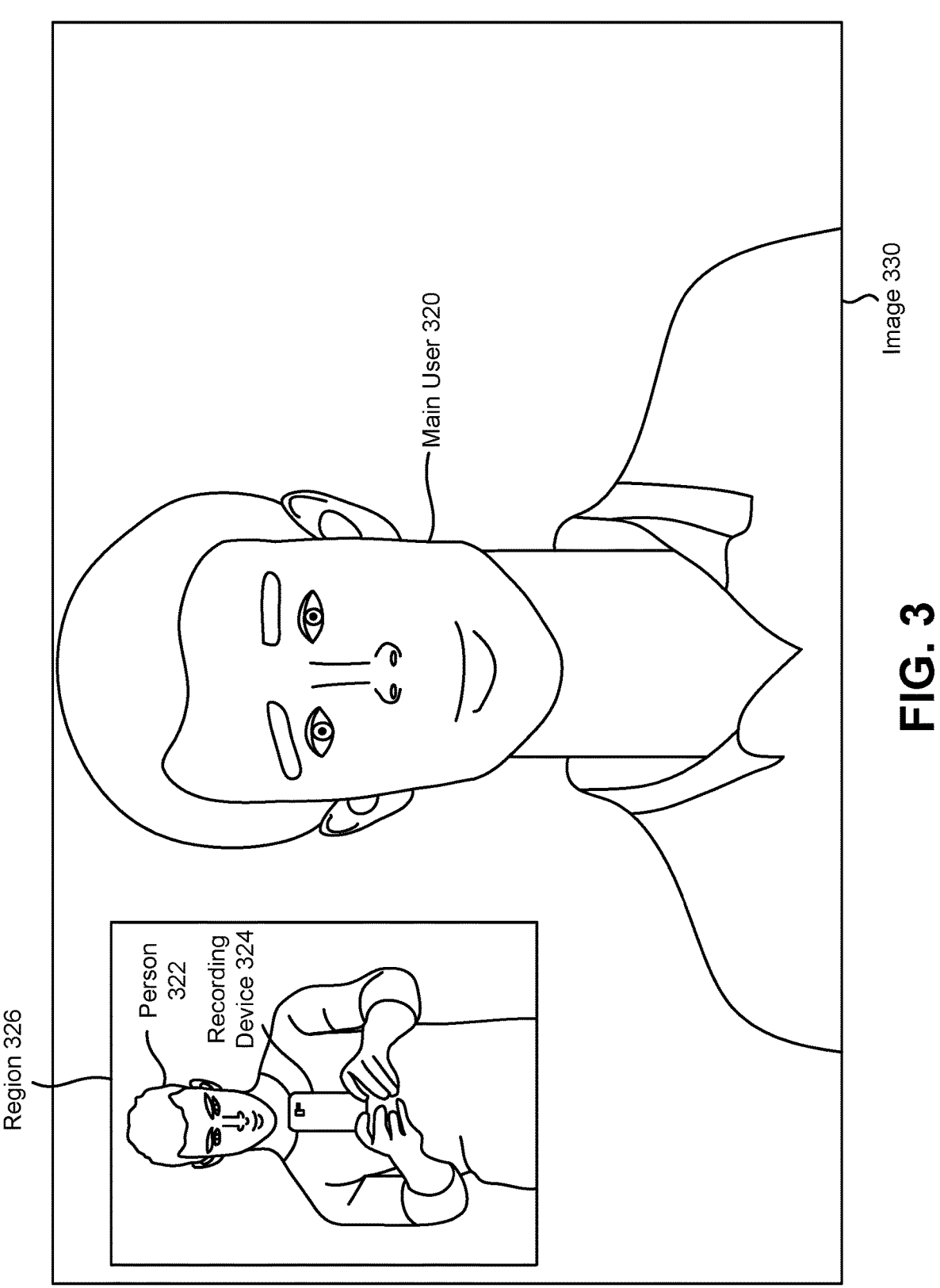
FIG. 3 is an example of an image captured by a camera.
Figure 4:
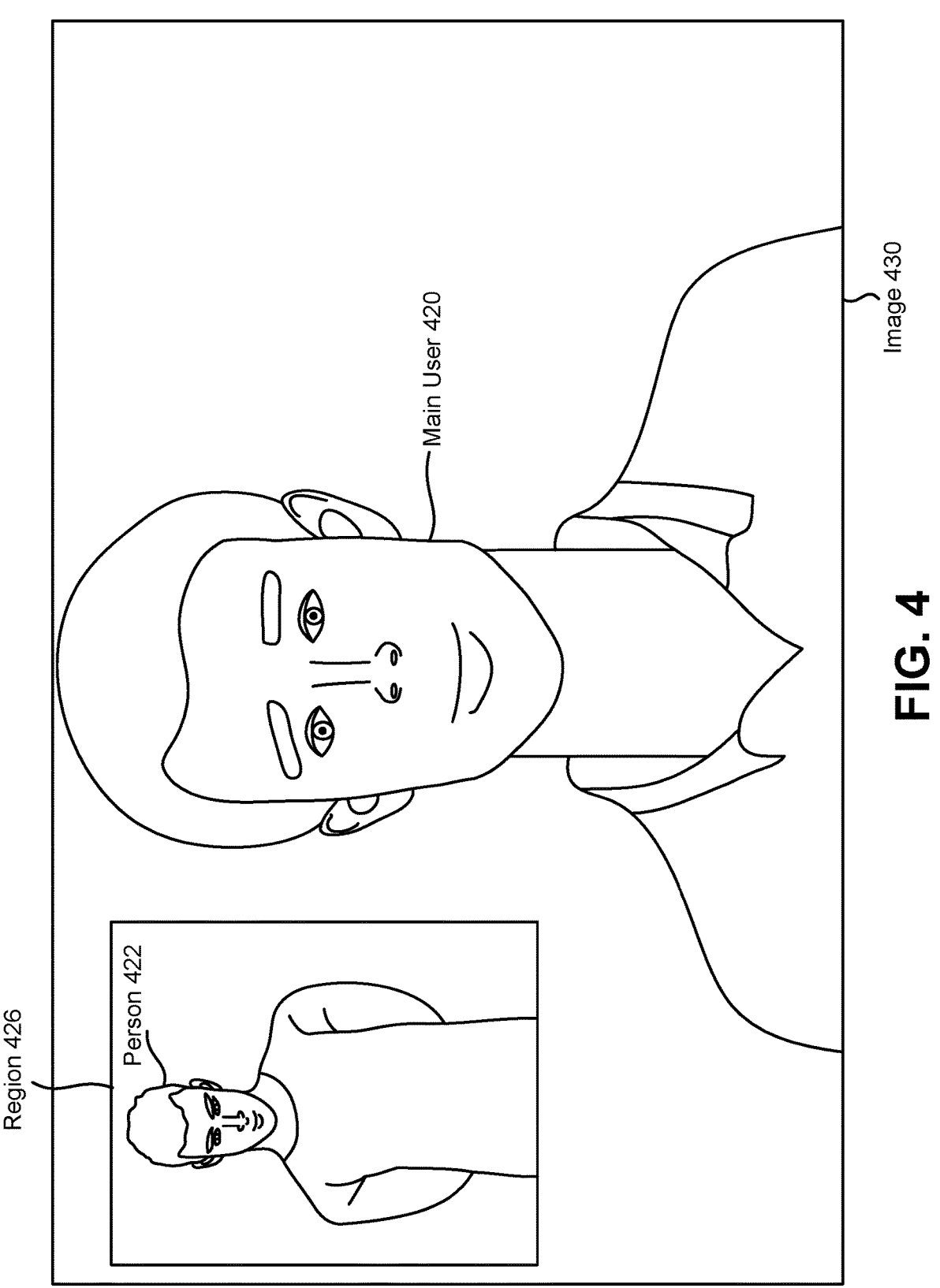
FIG. 4 is an example of another image captured by a camera.

The high-resolution image 112 may generate more reliable surveillance detection because it may contain more detail of hands, faces, and/or recording devices than may be present in the low-resolution image 110 of the first set 109. FIG. 3 and FIG. 4 illustrate examples of images that may be captured by the camera 106.

In FIG. 3, the image 330 includes a main user 320. A person 322 with a recording device 324 is in the background of the image 330. In this example, the electronic device 102 of FIG. 1 may detect a region 326 that is greater than a size threshold and within a location threshold.

In FIG. 4, the image 430 includes a main user 420. In this example, the person 422 in the background of the image 430 is looking toward the display device 104 of FIG. 1. The region 426 containing the person 422 may also be greater than a size threshold and within a location threshold.

Referring again to FIG. 1, in some examples, the processor 108 may provide an image of the second set 111 to a machine-learning model 116 in response to detecting the scene change. In some examples, the machine-learning model 116 may be a trained model that runs on a neural network. Examples of neural networks include convolutional neural networks (CNNs) (e.g., basic CNN, R-CNN, inception model, residual neural network, etc.) and detectors that are built on convolutional neural network (e.g., Single Shot MultiBox Detector (SDD), You Only Look Once (YOLO), etc.). Different depths (e.g., layers) of a neural network or neural networks may be utilized in accordance with some examples of the techniques described herein.

The machine-learning model 116 may be trained to detect surveillance of the display device 104. For example, the machine-learning model 116 may be trained to detect different types of surveillance of the display device 104. In some examples, the machine-learning model 116 may be trained using training data that includes images of a second person in various locations behind a main user. The second person in the training images may also be holding a recording device (e.g., a camera, smartphone, etc.) aimed at screen. The training images may show the second person with different eye gazes and/or head orientation.

In some examples, the training data may be categorized according to a class of surveillance detection. In some examples, the training data may include multiple different classes of surveillance detection.

For example, the machine-learning model 116 may be trained to detect a person looking at the display device 104. In this example, the training data may include images of a non-collaborative second person who is looking at the screen, without holding any device. This second person may stand behind the main user and may appear small in the image. The second person may be positioned in a number of different poses. As used herein, a "non-collaborative" person is a human that is not interacting with the main user of the electronic device 102. For example, the main user may not be aware of the non-collaborative person. The non-collaborative person may be identified based on their size and location relative to the main user. For example, the non-collaborative person may appear small and distant from the main user.

In another example, the machine-learning model 116 may be trained to detect a recording device aimed at the display device 104. For example, a second person in training images may hold a smartphone device that is aimed at the display device 104. In this case, the second person may appear small compared with the main user. This training data may show the second person holding the smartphone device in a number of different poses.

In another example, the machine-learning model 116 may be trained to detect a recording device other than a smartphone device. For example, a set of training data may include a number of images of a non-collaborative second person holding another recording device (e.g., a digital camera, a video camcorder, augmented reality glasses, etc.) that is aimed at the display device 104. This training data may show the second person holding the other recording device in a number of different poses.

The machine-learning model 116 may also be trained to distinguish non-surveillance scenarios. For example, the machine-learning model 116 may be trained to identify and ignore a main user holding a recording device. In this case, the training data may include a number of images in which a main user holds a recording device (e.g., smartphone, camera, etc.) in different poses.

In other examples, the machine-learning model 116 may be trained to ignore a second person collaborating with a main user. For example, the second person may appear of similar size and in close proximity to the main user. In this case, the training data may include a number of images in which a second person is located near the main user. The second person may be shown in a number of different poses. A collaborative second person may be looking toward the main user and/or the display device 104. A collaborative second person may be at a close location to the main user and appears in a larger size than a person (e.g., a non-collaborative person) standing behind the main user.

In some examples, the image 112 of the second set 111 may be provided to the machine-learning model 116. Upon receiving the image 112 of the second set 111, the machine-learning model 116 may detect surveillance of the display device 104 based on the trained surveillance classes and/or trained non-surveillance classes. In some examples, the processor 108 may convert the image 112 to a resolution used by the neural network. For example, the image 112 may be converted to 224×224 pixels.

For example, the machine-learning model 116 may detect a person looking at the display device 104. In this case, the person may be located behind the main user in the image 112 of the second set 111. In another example, the machine-learning model 116 may detect a recording device aimed at the display device 104. In this case, the machine-learning model 116 may detect a person holding a recording device aimed at the display device 104. In these cases, the machine-learning model 116 may detect surveillance of the display device 104.

In other examples, the machine-learning model 116 may ignore non-surveillance conditions in the image 112 of the second set 111. For example, the machine-learning model 116 may ignore the main user holding a recording device. In other examples, the machine-learning model 116 may ignore a second person collaborating with the main user. If no surveillance is detected, the electronic device 102 may return to monitoring images captured by the camera 106 in low-resolution mode to detect scene changes.

In some examples, the processor 108 may use non-maximum suppression (NMS) to remove surveillance candidates of low confidence or for removing overlapped surveillance detections. Furthermore, NMS may be used to generate a bounding box around a detected person or recording device.

In some examples, the processor 108 may generate an alert in response to the machine-learning model 116 detecting surveillance of the display device 104. For example, the processor 108 may cause a text warning or other graphical warning to be displayed on the display device 104. The text warning may indicate that surveillance has been detected. In another example, the processor 108 may cause an alert sound to be played by the electronic device 102.

In some examples, the processor 108 may obscure data displayed by the display device 104 in response to the machine-learning model 116 detecting surveillance of the display device 104. For example, the processor 108 may cause the display device 104 to dim its brightness. In another example, the processor 108 may cause the display device 104 to enter a privacy mode in which the displayed data is replaced by a warning.

In some examples, the processor 108 may respond differently based on the type of surveillance detected. For example, the processor 108 may perform a first response (e.g., display a warning) based on detection of a first type of surveillance (e.g., a person looking at the display device 104). The processor 108 may perform a second response (e.g., obscure the display device 104) based on detection of a second type of surveillance (e.g., a person holding a recording device aimed at the display device 104).

In some examples, a recording device (e.g., a camera, smartphone, etc.) may present a greater threat to the data and security of the user than a single person behind the electronic device 102. A person may forget the data, may not be able to read all of the information onscreen, or may not be able to see all of the details onscreen. However, if a recording device captures the image onscreen, the details displayed by the display device 104 may be retained, re-read, and/or zoomed in. Because of this, recording devices may present a greater risk. As such, the electronic device 102 may respond differently to detection of a recording device than detection of a human observer.

In some examples, the processor 108 may perform an initial surveillance detection. For example, during an initialization process, the camera 106 may capture a high-resolution image when the electronic device 102 starts up, wakes from a sleep state, or otherwise becomes activated. The image may be cropped based on pre-defined object regions to generate multiple images. For example, the multiple images may be located in the middle, left side, and/or right side of the image. These cropped images may be provided to the machine-learning model 116 to check if the background or scene contains a hand with a recording device. As described above, the machine-learning model 116 may be trained to detect recording devices with known shapes and other distinguishable image characteristics (e.g., a mobile phone or a digital camera being held by hands). Therefore, the neural network-based object detection by the machine-learning model 116 may detect a recording device at various angles relative to the camera 106 and/or with various hand placement of a person holding the recording device.

In an example, a user may use the electronic device 102 in a public area (e.g., an airport, coffee shop, park, etc.) and may log onto the electronic device 102 without noticing that there is a surveillance camera mounted behind the electronic device 102. In this case, the surveillance camera may be positioned to record the display device 104 of the electronic device 102. The processor 108 may detect the recording device based on the trained machine-learning model 116 (e.g., based on features of the lens of the recording device). The processor 108 may then alert the user of the presence of the recording device.

It should be noted that the surveillance detection described herein may be based on scene change detection performed on low-resolution images. The use of low-resolution images to trigger surveillance detection by the machine-learning model 116 may conserve energy that would be used to process high-resolution images in the machine-learning model 116. Therefore, these examples may be suitable for an embedded solution with a low-power chip. Furthermore, the computer vision-based surveillance detection examples described herein may enhance the privacy and security of users when they are viewing content on a display device 104.

FIG. 5 is a block diagram illustrating an example of a computer-readable medium 532 for detecting surveillance of a display device. The computer-readable medium 532 may be a non-transitory, tangible computer-readable medium 532. The computer-readable medium 532 may be, for example, RAM, EEPROM, a storage device, an optical disc, and the like. In some examples, the computer-readable medium 532 may be volatile and/or non-volatile memory, such as DRAM, EEPROM, MRAM, PCRAM, memristor, flash memory, and the like. In some examples, the computer-readable medium 532 described in FIG. 5 may be an example of memory for an electronic device described herein. In some examples, code (e.g., data and/or executable code or instructions) of the computer-readable medium 532 may be transferred and/or loaded to memory or memories of the electronic device.

The computer-readable medium 532 may include code (e.g., data and/or executable code or instructions). For example, the computer-readable medium 532 may include scene change detection instructions 534, scene change region instructions 536, image cropping instructions 538, and surveillance detection instructions 540.

In some examples, the scene change detection instructions 534 may be instructions that when executed cause the processor of the electronic device to detect a scene change in a first set of images captured by a camera. The first set of images may have a first resolution (e.g., a low resolution). In some examples, this may be accomplished as described in FIG. 1.

In some examples, the scene change region instructions 536 may be instructions that when executed cause the processor of the electronic device to determine a region in an image of the first set with a change greater than a threshold amount. In some examples, this may be accomplished as described in FIG. 1. In some examples, the processor may determine whether a location of the region is within a location threshold. The processor may also determine whether a size of the region is greater than a size threshold. The processor may activate surveillance detection in response to determining that the location of the region is within the location threshold and the size of the region is greater than the size threshold.

In some examples, the image cropping instructions 538 may be instructions that when executed cause the processor of the electronic device to crop an image of a second set captured by the camera. The cropping may be based on the region in the image of the first set. The second set of images may have a second resolution that is higher than the first resolution. In some examples, this may be accomplished as described in FIG. 1.

In some examples, the surveillance detection instructions 540 may be instructions that when executed cause the processor of the electronic device to provide the image of the second set to a machine-learning model trained to detect surveillance of the display device. In some examples, this may be accomplished as described in FIG. 1.

In some examples, the computer-readable medium 532 may also include instructions that when executed cause the processor of the electronic device to generate an alert in response to the machine-learning model detecting surveillance of the display device. In other examples, the computer-readable medium 532 may also include instructions that when executed cause the processor of the electronic device to obscure data displayed by the display device in response to the machine-learning model detecting surveillance of the display device.

Figure 6:
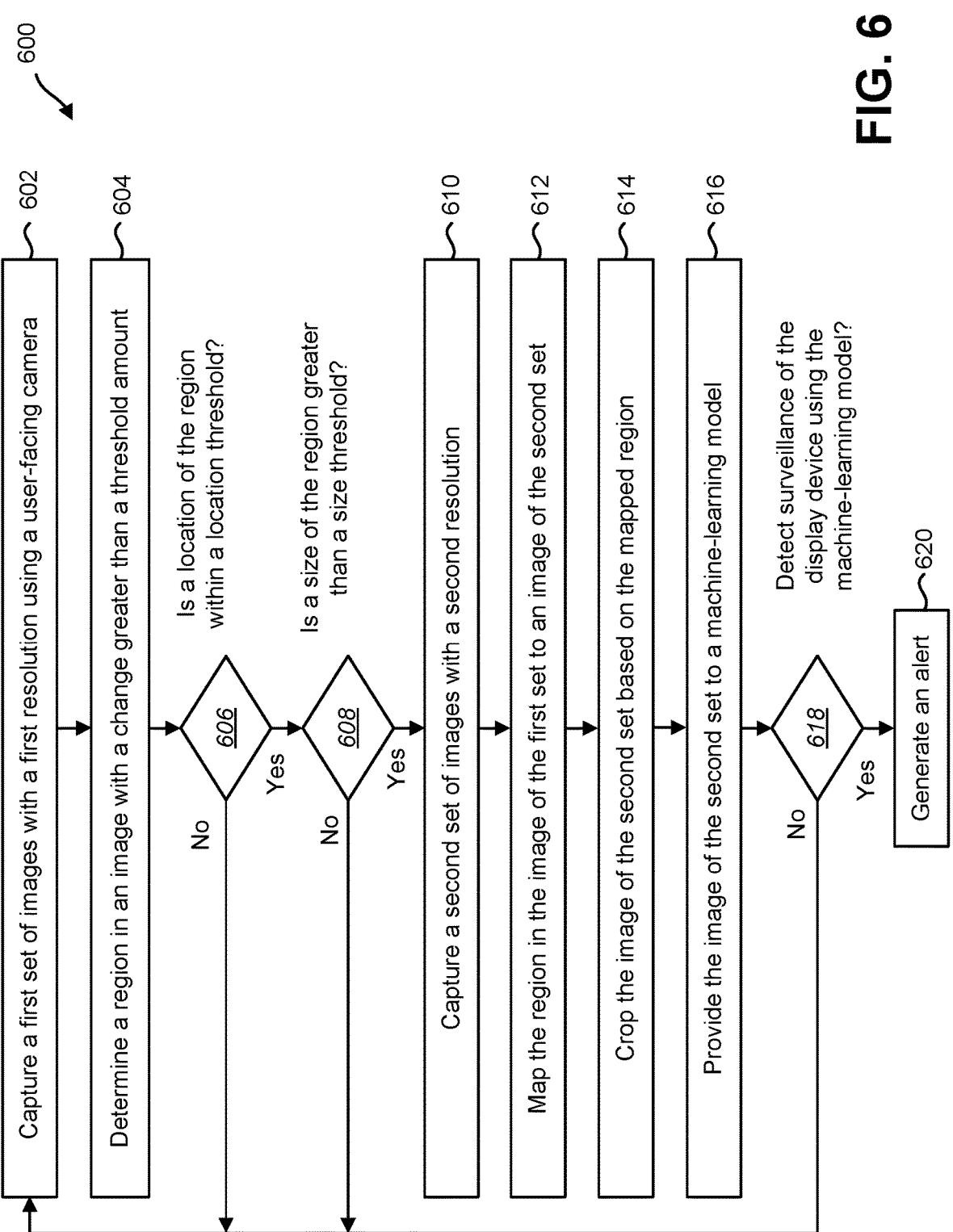
FIG. 6 is a flow diagram illustrating an example of a method for detecting display device surveillance.

FIG. 6 is a flow diagram illustrating an example of a method 600 for detecting display device surveillance. The method 600 and/or an element or elements of the method 600 may be performed by an electronic device. For example, an element or elements of the method 600 may be performed by the electronic device 102 described in FIG. 1 and/or the processor 108 described in FIG. 1 any of which may be referred to generally as an "electronic device" in FIG. 6.

At 602, the electronic device may capture a first set of images with a first resolution using a camera. The first set of images may have a first resolution (e.g., a low resolution). The camera may be positioned to view a main user of the electronic device.

At 604, the electronic device may determine a region in an image of the first set with a change greater than a threshold amount. For example, the electronic device may determine an inter-frame pixel-wise difference to detect a region of pixels in the image of the first set with a difference greater than a threshold. In some examples, determining the region with a scene change may include determining the location and size of the region.

At 606, the electronic device may determine whether a location of the region is within a location threshold. For example, the electronic device may determine a center of the region. The electronic device may then determine whether the center of the region is within a range of locations (e.g., pixel locations) within the image of the first set defined as valid locations to monitor for display device surveillance. If the electronic device determines that the location of the region is not within a location threshold (e.g., the region is located at a border, at the main user, etc.), then the electronic device may continue to capture another image at 602.

If the electronic device determines, at 606, that the location of the region is within the location threshold, then the electronic device may determine, at 608, whether the size of the region is greater than a size threshold. If the electronic device determines that the size of the region is less than or equal to a size threshold, then the electronic device may continue to capture another image at 602. If the electronic device determines that the size of the region is greater than the size threshold, then the electronic device may capture a second set of images using the camera, at 610. The second set of images may have a second resolution that is higher than the first resolution of the first set.

At 612, the electronic device may map the region in the image of the first set to the image of the second set. For example, the image of the first set may be upscaled and pixels in the image of the first set may be mapped to corresponding pixels in the image of the second set. At 614, the electronic device may crop the image of the second set based on the region mapped to the image of the second set.

At 616, the electronic device may provide the image of the second set (e.g., the cropped portion of the second set image) to a machine-learning model. The machine-learning model may be trained to detect surveillance of the display device. For example, the machine-learning model may be trained to detect a person looking at the display device. In another example, the machine-learning model may be trained to detect a recording device aimed at the display device. In yet another example, the machine-learning model may be trained to detect a person holding a recording device aimed at the display device.

In some examples, the electronic device may be trained to ignore a main user holding a recording device. In other examples, the electronic device may be trained to ignore a second person collaborating with a main user.

At 618, the electronic device may determine the machine-learning model detected surveillance of the display device. For example, the machine-learning model may process the image of the second set. If the machine-learning model detects surveillance of the display device, then the electronic device may generate an alert, at 620. If the machine-learning model does not detect surveillance of the display device, then the electronic device may continue to capture another image, at 602.

FIG. 7 is a flow diagram illustrating another example of a method 700 for detecting display device surveillance. The method 700 and/or an element or elements of the method 700 may be performed by an electronic device. For example, an element or elements of the method 700 may be performed by the electronic device 102 described in FIG. 1 and/or the processor 108 described in FIG. 1 any of which may be referred to generally as an "electronic device" in FIG. 7.

At 702, the electronic device may set the camera in a low-resolution mode. For example, the camera may be set to capture low-resolution images.

At 704, the electronic device may capture low-resolution images (e.g., a first set) by the camera. The camera may be positioned to view a main user of the electronic device.

At 706, the electronic device may generate inter-frame temporal vectors. This may be accomplished as described in FIG. 1.

At 708, the electronic device may detect a scene change in the low-resolution image. For example, based on the generated inter-frame temporal vectors, the electronic device may detect a region in the low-resolution image with changes in pixel values over a threshold amount. In some examples, the scene change detection may be based on changes in a mean background, detection of a user with a bounding rectangle, and/or background change heuristics.

At 710, the electronic device may determine whether the scene change was due to lighting. For example, if the scene change is due to lighting changes, then the electronic device may capture another low-resolution image, at 704. If the electronic device determines that the scene change was not due to a lighting change, then the electronic device may determine, at 712, whether the scene change was from the main user. If the electronic device determines that the main user causes the scene change, then the electronic device may capture another low-resolution image, at 704.

If the electronic device determines that the scene change was not from the main user, then the electronic device may extract, at 714, a region of change from the low-resolution image. The region extraction may include determining a boundary surrounding changed pixels. The region extraction may also include determining the region size and central location of the region.

At 716, the electronic device may determine whether the region size and location are within thresholds. For example, the electronic device may determine that the size of the region is greater than a size threshold. The electronic device may also determine that the location (e.g., central location) of the region is within a location threshold of the image. If the region size and location are not within thresholds, then the electronic device may capture another low-resolution image, at 704.

If the region size and location are within thresholds, then the electronic device may switch, at 718, the camera to a high-resolution mode. For example, the high-resolution mode may set the camera to capture high-resolution images. At 720, the electronic device may capture high-resolution images (e.g., a second set) using the camera.

At 722, the electronic device may crop a high-resolution image based on the region extracted from the low-resolution image. For example, the electronic device may map the region from the low-resolution image to a high-resolution image. The electronic device may then crop the mapped region in the high-resolution image.

At 724, the electronic device may provide the high-resolution image (e.g., the cropped region of the high-resolution image) to a machine-learning model. In some examples, the machine-learning model may be trained to detect a person viewing the display device of the electronic device. In other examples, the machine-learning model may be trained to detect surveillance by a recording device. The electronic device may process the high-resolution using the machine-learning model.

At 726, the electronic device may determine whether surveillance was detected. For example, the electronic device may determine whether the machine-learning model detected a person or recording device viewing the display device. If no surveillance is detected in the high-resolution image, then the electronic device may capture another low-resolution image, at 704.

If, at 726, surveillance is detected in the high-resolution image, then at 728 the electronic device may generate an alert. For example, the electronic device may display a warning to the main user. In another example, the electronic device may dim the screen of the display device.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. An electronic device, comprising:
    a camera;
    a display device; and
    a processor to:
        detect a scene change in a first set of images captured by the camera, the first set of images having a first resolution;
        extract a region of interest in an image of the first set of images based on the scene change;
        switch the camera to a high resolution mode and capture a second set of images, the second set of images having a second resolution that is higher than the first resolution;
        map a region in an image of the second set of images based on the region of interest in the image of the first set of images;
        crop a region of the image of the second set of images based on the mapped region; and
        process the cropped region of the image of the second set of images captured by the camera to detect surveillance of the display device.

2. The electronic device of claim 1, wherein the processor is to determine the region of interest in the image of the first set of images with a change greater than a threshold amount.

3. The electronic device of claim 2, wherein the processor is to:
    determine whether a location of the region is within a location threshold;
    determine whether a size of the region is greater than a size threshold; and
    activate the surveillance detection in response to determining that the location of the region is within the location threshold and the size of the region is greater than the size threshold.

4. The electronic device of claim 1, wherein detecting the scene change comprises the processor to ignore lighting changes and main-user movement.

5. An electronic device, comprising:
    a camera;
    a display device; and
    a processor to:
        detect a scene change in a first set of images captured by the camera, the first set of images having a first resolution;
        extract a region of interest in an image of the first set of images based on the scene change;

switch the camera to a high resolution mode and capture a second set of images, the second set of images having a second resolution that is higher than the first resolution;

map a region in an image of the second set of images based on the region of interest in the image of the first set of images;

crop a region of the image of the second set of images based on the mapped region; and process the cropped region of the image of the second set of images using a machine-learning model to detect surveillance of the display device.

6. The electronic device of claim 5, wherein the machine-learning model is trained to detect a person looking at the display device.

7. The electronic device of claim 6, wherein the person is located behind a main user in the image of the second set.

8. The electronic device of claim 5, wherein the machine-learning model is trained to detect a recording device aimed at the display device.

9. The electronic device of claim 5, wherein the machine-learning model is trained to detect a person holding a recording device aimed at the display device.

10. The electronic device of claim 5, wherein the machine-learning model is trained to ignore a main user holding a recording device.

11. The electronic device of claim 5, wherein the machine-learning model is trained to ignore a second person collaborating with a main user.

12. A non-transitory tangible computer-readable medium comprising instructions when executed cause a processor of an electronic device to:

detect a scene change in a first set of images captured by a camera, the first set of images having a first resolution;

determine a region in an image of the first set of images with a change greater than a threshold amount;

map a region in an image of a second set of images captured by the camera having a second resolution higher than the first resolution based on the region in the image of the first set of images;

crop a region of the image of the second set of images captured by the camera, the cropping being based on the region in the image of the first set of images; and process the cropped region of the image of the second set of images using a machine-learning model to detect surveillance of a display device.

13. The non-transitory tangible computer-readable medium of claim 12, wherein the processor is to generate an alert in response to the machine-learning model detecting surveillance of the display device.

14. The non-transitory tangible computer-readable medium of claim 12, wherein the processor is to obscure data displayed by the display device in response to the machine-learning model detecting surveillance of the display device.

* * * * *